(12) United States Patent
Flanery

(10) Patent No.: US 7,406,779 B2
(45) Date of Patent: Aug. 5, 2008

(54) VARIABLE DIE FOR USE IN DRYING SYNTHETIC ELASTOMERS

(75) Inventor: Timothy Flanery, Louisville, KY (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 19 days.

(21) Appl. No.: 10/550,816

(22) PCT Filed: May 25, 2004

(86) PCT No.: PCT/US2004/016338

§ 371 (c)(1),
(2), (4) Date: May 26, 2006

(87) PCT Pub. No.: WO2004/110715

PCT Pub. Date: Dec. 23, 2004

(65) Prior Publication Data

US 2006/0230631 A1    Oct. 19, 2006

Related U.S. Application Data

(60) Provisional application No. 60/474,445, filed on May 30, 2003.

(51) Int. Cl.
*B29B 13/06* (2006.01)
*B29C 47/76* (2006.01)
*B30B 9/12* (2006.01)

(52) U.S. Cl. ............... 34/387; 34/398; 34/79; 159/2.2; 159/47.1; 425/191; 425/198

(58) Field of Classification Search ............. 425/191, 425/198; 34/386, 387, 398, 418, 79; 159/2.2, 159/2.3, 47.1
See application file for complete search history.

(56) References Cited

U.S. PATENT DOCUMENTS

| 3,067,462 A | 12/1962 | Kullgren |
| 3,178,770 A | 4/1965 | Willis |
| 3,225,453 A | 12/1965 | Burner |
| 3,230,865 A | 1/1966 | Hibbel et al. |
| 3,672,641 A | 6/1972 | Slaby |
| 3,766,848 A | 10/1973 | French et al. |
| 3,834,440 A | 9/1974 | McCracken |
| 6,025,004 A | 2/2000 | Speck et al. |

*Primary Examiner*—Robert B Davis
(74) *Attorney, Agent, or Firm*—Dority & Manning, P.A.

(57) ABSTRACT

Apparatus and methodologies are provided for flash drying liquid materials using a variable die. A die and a die body are provided with an adjustably configured pressure regulating variable obstruction in the material flow path that allows control of the pressure applied to the material and consequent control of the temperature of the material as it enters the die. Optimizing pressure and temperature allows optimization of the flash drying process.

16 Claims, 4 Drawing Sheets

VARIABLE DIE FOR USE IN DRYING SYNTHETIC ELASTOMERS

PRIORITY CLAIM

Applicant claims priority to an application filed in the United States Patent and Trademark Office on May 30, 2003, entitled "Adjustable Extruder Die", with application Ser. No. 60-474445 and Reference No. P50-0108.

FIELD OF THE INVENTION

The present subject matter relates to synthetic elastomers and, more particularly, to methodologies and apparatus for drying, i.e., removing moisture, from such elastomers.

BACKGROUND OF THE INVENTION

Expeller-expander technology is a processing technique that has been available in various forms dating back to the nineteenth century. The present area of concern relates to that area of an elastomer processing sequence (including synthetic and natural elastomers) where the rubber material has been combined with water and now the water is to be removed.

In previously used configurations, two extruders in series have been employed to remove moisture from the rubber. Generally, the first extruder, also referred to as the expeller, squeezes the rubber between a pair of intermeshed screws. This portion of the process is generally able to reduce the moisture content from about 60% to about 15%.

Following the first stage of the drying process by the expeller, the rubber material is passed to a second extruder referred to as an expander for additional drying. This second extruder increases pressure on and consequently the temperature of the rubber, thus creating a super heated liquid. As this super heated liquid is forced through the extruder, again commonly by using screw drive technology, the material is forced through dies or filter screens at the end of the screw where the moisture, or volatile matter, will flash dry.

The flash drying process corresponds to a rapid change in state from liquid to vapor as the supper heated rubber material passes through the die or filter screen and suddenly returns to normal atmospheric pressure while the water temperature may still be significantly higher than 100 degrees Celsius. The energy necessary to produce the flash drying phenomena is transferred to the rubber from the screw drive mechanism in the expander. This transfer of energy is made possible by the resistance of the rubber to exit the expander through the dies. The temperature and pressure on the super heated rubber reach a maximum at the dies, thus for a given screw speed and rubber flow rate, the resistance, and therefore the amount of energy transferred to the rubber, is dependent on the pressure at the head.

The pressure is fixed by the pressure drop induced by the passage of the super heated rubber through the die. In a practical system, there will be a number of dies at the exit point of the expander and thus the pressure will depend on the number of dies, their geometry and aperture size. In previously employed configurations, all of these aspects of the dies were fixed with any one processing sequence. Because the prior art is a fixed and unchangeable configuration, certain production problems have occurred that the present technology addresses and overcomes.

When the super heated rubber goes through the dies, the flash drying process produces decohesion of the rubber thereby creating rubber crumbs that are transported to balers for further processing. The control of the size of these crumbs is one of the aspects effecting good transportation of the rubber through the remaining processing sequences and, consequently, can have an impact on further processing. For example, reduction of conveyor fouling can occur based on production of too small a crumb size. As the currently available technology employs preset die configurations, no capability other than stopping production is available to address issues involving pressure adjustment and crumb size. Moreover, there is no capability for optimizing the overall rubber processing process outside of controlling the expeller-expander screw speed without shutting down production.

While various implementations of extruder-expander technology have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for drying synthetic elastomeric materials has been developed. The present technology, therefore, is directed to methodologies and apparatus that provide for the optimization of the pressure at the die or filter screen without the necessity of shutting down production.

In an exemplary embodiment of the present subject matter, apparatus and accompanying methodologies are provided for dynamically optimizing the overall operation of an extruder-expander system that does not require shutting down production to achieve optimized operation of the system.

In a further exemplary embodiment of the present subject matter, methodologies and apparatus are provide that allows crumb size adjustment during the production process without having to resort to expander shut down to alter the die set up.

In yet a further exemplary embodiment of the present subject matter, pressure at the die head as well as crumb size may be automatically controlled.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
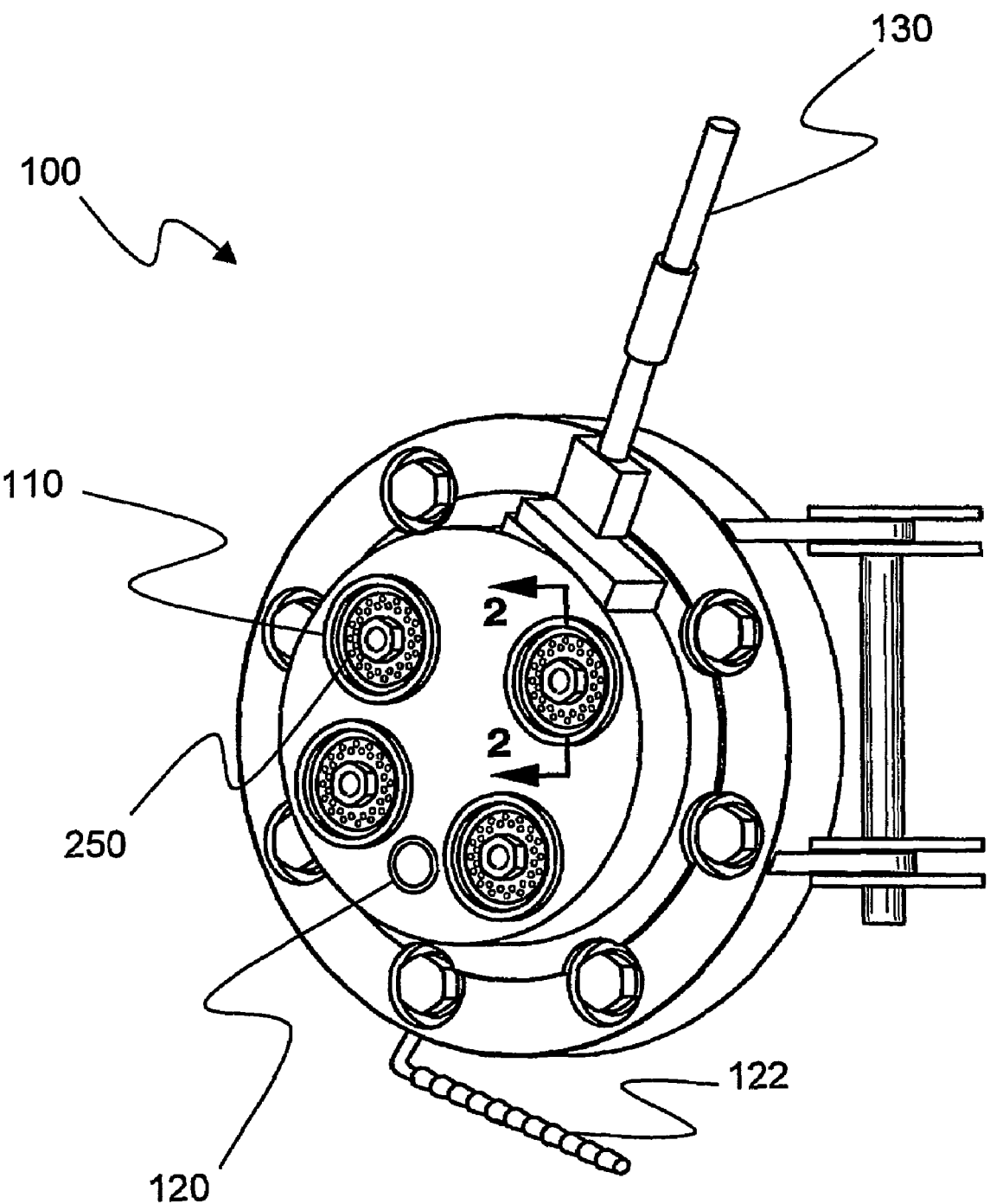
FIG. 1 illustrates an expander head and shows a die head set up employing four separated die heads.

Repeat use of reference characters throughout the present specification and appended drawings is intended to represent same or analogous features or elements of the invention.

DETAILED DESCRIPTION OF THE PREFERRED EMBODIMENTS

With reference now to FIG. 1, there is illustrated an expander head 100 configured to house four separate die heads 110. It should be appreciated that, although four die heads 110 are illustrated in the present configuration, such is exemplary only as the number of die heads may vary depending on processing requirements such as the specific type of synthetic elastomer being processed. Shown also is a relief valve port 120 and operating handle 122 that may be used to make sure the pressure in the expander has been relieved at those times when it becomes necessary to shut down the production line and/or service the expander head 100. Control shaft 130 may be coupled to a control mechanism and is employed to dynamically adjust the die settings as will be more fully explained later. It should be appreciated that control shaft 130 and its accompanying control mechanism may be associated with automated control equipment, not illustrated, for automatically controlling the opening size of the variable die of the present subject matter in accordance with specific processing requirements as will be more fully explained later.

Figure 2:
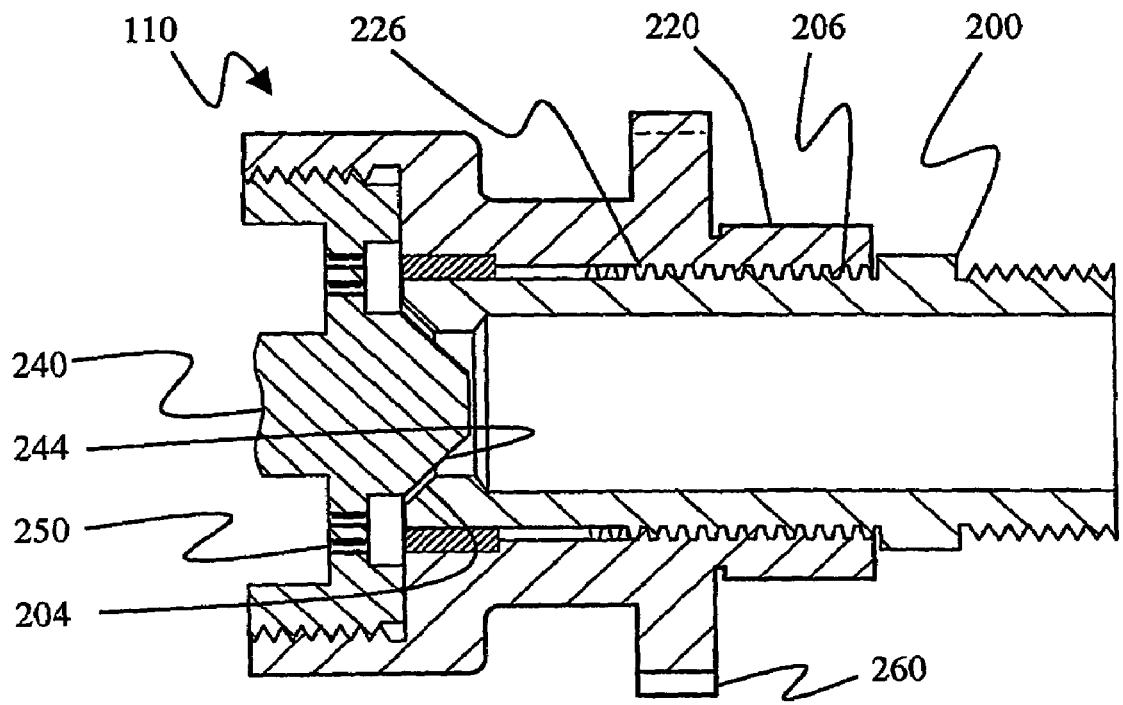
FIG. 2 illustrates a cross sectional view taken along line 2-2 of FIG. 1 and showing a die head in accordance with the present subject matter.
Figure 3:
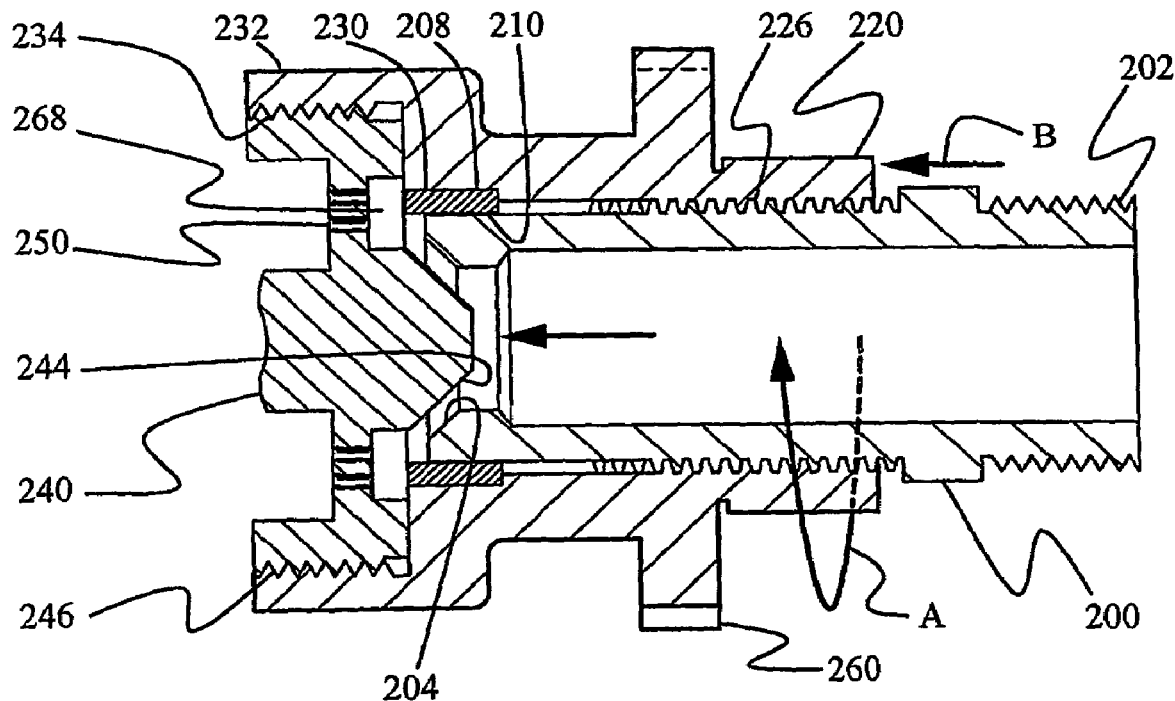
FIG. 3 illustrates a second cross sectional view of the die head illustrated in FIG. 2 and shows the adjustability aspect of the present subject matter.

FIGS. 2 and 3 are both cross sectional illustrations taken along line 2-2 illustrated in FIG. 1 of the variable die in accordance with the present exemplary embodiment. FIGS. 2 and 3 illustrate, respectively, a relatively "closed" position and a relatively "open" position of the variable die. As seen from both FIGS. 2 and 3, the variable die of the present subject matter is constructed from three major portions: a die body 200, an adjustment sleeve 220, and a filter screen 240. Die body 200 may be secured to the extruder head 100 by means of threaded portion 202 cooperating with a matching threaded coupling means, not shown, on the extruder head. An aspect of die body 200 of particular significance to the present subject matter resides in the provision of a beveled or conical surface 204 that, together with conical surface 244 of filter screen 240 forms a pressure adjusting system as will be more fully explained later. With further reference to FIGS. 2 and 3, it will be noted that die body 200 is fitted with an additional threaded portion 206, the threads of which are configured to mate with threaded portion 226 of adjustment sleeve 220.

Adjustment sleeve 220, as shown, is configured to overlie and threadedly engage die body 200 in a pressure sealed manner. Improved sealing capability is supplied through the use of O-ring seal 208 positioned between an outer lateral end portion 210 of die body 200 and an inner surface 230 of adjustment sleeve 220. Adjustment sleeve 220 is expanded at one end portion 232 thereof and internally threaded with threads 234 that cooperate with matching threads 246 on the outer periphery of filter screen 240.

Figure 5:
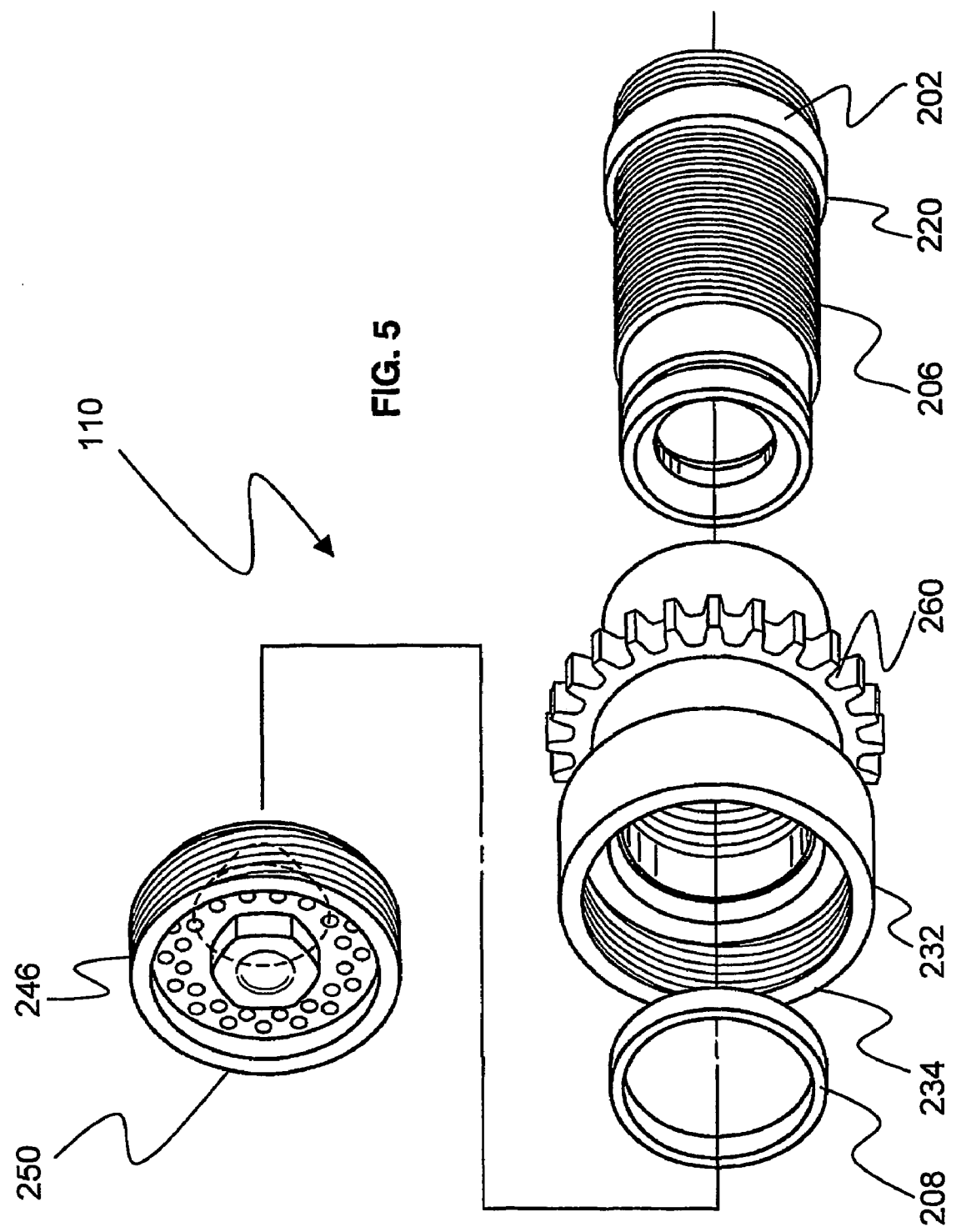
FIG. 5 illustrates and exploded view of a die head in accordance with the present subject matter.

Filter screen 240, as mentioned, has outer periphery threads 246 that cooperate with threads 234 of the adjustment sleeve 220 in such manner as to hold filter screen 240 securely in place by tightly seating the threaded filter screen 240 into the threaded expanded portion 232 of the adjustment sleeve 220. Filter screen 240 is perforated with a plurality of uniformly spaced flash channels 250, as best seen in FIGS. 1 and 5. As with the previously noted exemplary illustration of four die heads 110 illustrated in FIG. 1 as mounted in the extruder head 100, the exact number of flash channels 250 provided in each die head 110 will vary depending on specific requirement relating to the particular type of material being processed.

Acting as, inter alia, a distributor to the plurality of flash channels 250 of the material being processed is another significant feature of the present subject matter seen in the form of turbulence channel 268. By design, turbulence channel 268 is configured within the filter screen 240 in such manner as to provide at least a minimum volume regardless of the relative position of the adjustment sleeve 220 with respect to the die body 200. Turbulence chamber 268 is where a first flash drying and decohesion of the processed synthetic elastomer takes place. As the material being processed passes through the pressure control system created by the adjustable space between conical surface 204 of the die body 200 and conical surface 244 of the filter screen 240, a reduction in pressure occurs allowing the material being processed to break apart and form crumbs due to the rapid vaporization of a portion of the moisture trapped within the material.

A second flash drying of the material being processed occurs as the material passes from the turbulence chamber 268 through the plurality of flash channels 250. Upon passage of the still super heated material through flash channels 250 and sudden exposure to atmospheric pressure, substantially all of the remaining moisture in the material being processed instantly enters a vaporous state.

As previously mentioned, the energy necessary to produce the flash drying effect is transferred to the material being processed from a screw drive in the expander. This energy is made possible, in part, by the resistance of the material to exit the expander through the die. This resistance is controlled in large measure in the present subject matter by the controlled spacing between conical surfaces 204 and 244.

With further reference, in particular, to FIG. 3, it will be noted that there is illustrated an arrow "A" indicating rotation of the adjustment sleeve 220 relative to the die body 200. Rotation of the adjustment sleeve 220 in the direction of arrow "A" produces movement of the adjustment sleeve and, consequently, movement of the attached filter screen 240, in the direction of arrow "B." That is rotation in the direction of the arrow "A" "opens" the space between the conical surfaces 204, 244. Conversely, of course, rotation in a direction opposite to arrow "A" "closes" the space between the conical surfaces 204, 244. In an exemplary configuration, the threads 206 of the die body and threads 226 of the adjusting sleeve may be configured such that a total of five (5) complete revolutions of adjustment sleeve 220 will move the filter screen 240 from a substantially closed, i.e. zero setting, position to an effectively fully open, i.e. 100%, position. During normal operation of the variable die of the present subject matter, given the "zero" and "100% open" definitions just mentioned, a normal operation range might comprise between 5% open and 95% open.

Rotation of the adjustment sleeve 220 may be effectively implemented by way of ring gear 260, most clearly seen in the exploded view of die head 110 illustrated in FIG. 5. Ring gear 260 is configured to cooperate with additional gearing, not shown, internal to expander head 100 that acts in concert with shaft 130 to simultaneously adjust all of the die heads 110 associated with expander head 100. As previously noted, such adjustment of the die heads 110 may be controlled by way of automated means which, although not illustrated, will be well understood by those of ordinary skill in the art to which the present subject matter pertains.

An important aspect of this opening and closing of the space between conical surfaces 204 and 244 is that a new mechanism has been provided permitting real time adjustment of the pressure applied to and the temperature generated in the material being processed. Prior to the teachings of the present subject matter, such control was obtainable only by stopping the production line and manually modifying the die setup. Clearly such prior modification technique was detrimental to efficient operation of the extruder-expander system. A yet more significant improvement in the operation of extruder-expander systems is possible as those of ordinary skill in the art grow to appreciate that the adjustment of the space between conical surfaces 204, 244 and thus the pressure and temperature of the process material, can be controlled automatically through microcontroller, computer, microprocessor or other automated processing devices.

Figure 4:
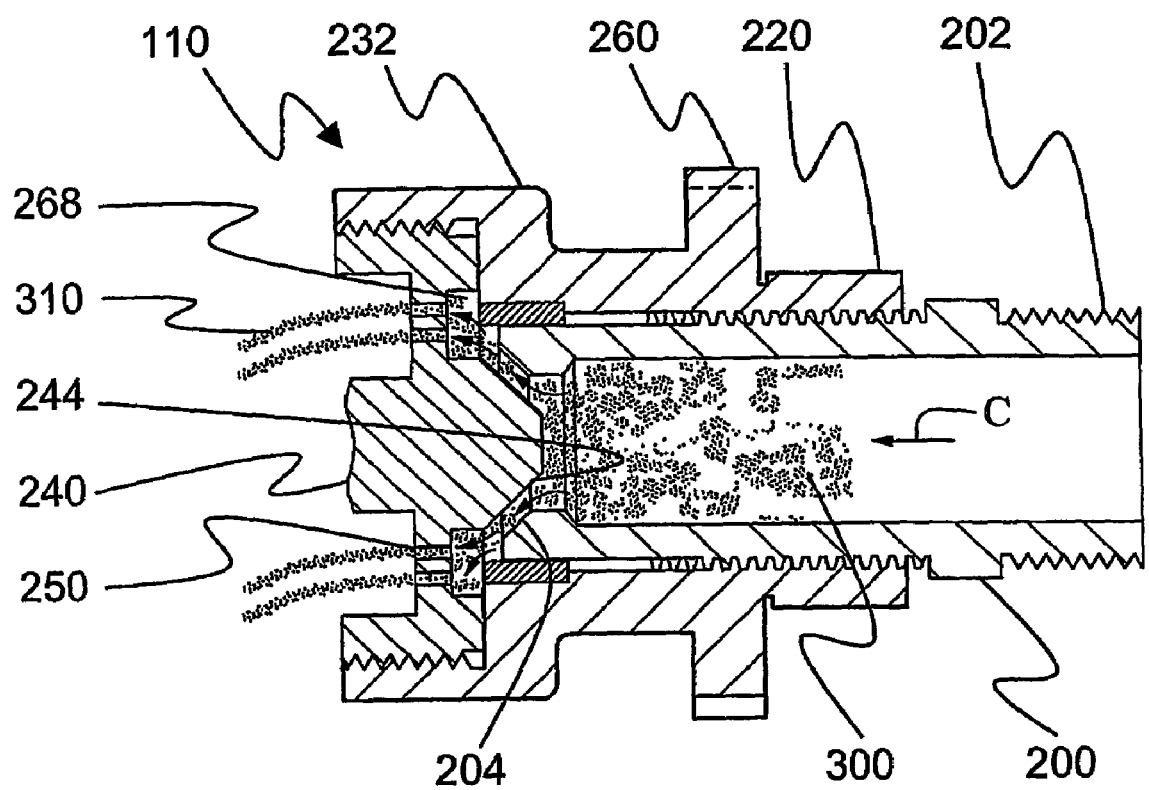
FIG. 4 illustrates a cross sectional view of a die head in accordance with the present subject matter in an operational state.

Referring briefly to FIG. 4, there is illustrated an operational embodiment of the present invention. As shown, material 300 to be processed and containing significant amounts of moisture, is forced through die head 110 in the direction of arrow "C" by a transport mechanism, not shown, but which may include a screw conveyor device. The amount of energy necessary to force the material 300 through the die head 110 is determined, in part, by the pressure adjusting spacing between conical surfaces 204, 244. As the material enters the pressure adjusting space and flows into turbulence chamber 268, a portion of the contained moisture is released from the material 300 due to the pressure drop as the material 300 enters the turbulence chamber 268. The pressure drop within turbulence chamber 268 and the subsequent release of moisture produces decohesion of the material 300 creating a crumbled form of the material 300. Finally, as the now crumbled material passes through flash channels 250, additional moisture is removed from the crumbled material as the pressure on the material is suddenly reduced to atmospheric pressure and substantially all of the remaining moisture turns to vapor.

While the present subject matter has been described in detail with respect to specific embodiments thereof, it will be appreciated that those skilled in the art, upon attaining an understanding of the foregoing may readily produce alterations to, variations of, and equivalents to such embodiments. For example, while the present invention has been described in use with drying mixtures containing elastomeric particles, the present invention is not so limited. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A variable die assembly for drying materials, comprising:
    a die body defining a longitudinally-oriented, interior passage through which the material is moved;
    an adjustment sleeve into which said die body and said interior passage are received, said adjustment sleeve and said die body configured for complementary attachment to each other; and
    a filter-screen attached to said adjustment sleeve and comprising a plurality of openings of predetermined size through which the material can be expelled;
    wherein said adjustment sleeve is selectively movable along said die body such that the distance between said filter screen and said die body may be adjusted.

2. A variable die assembly for drying materials as in claim 1, wherein said die body has a threaded outer surface and wherein said adjustment sleeve has a threaded inner surface configured for complementary receipt of the threaded outer surface of said die body.

3. A variable die assembly for drying materials as in claim 1, wherein said filter screen and said die body define opposing frustoconical surfaces between which the material can pass.

4. A variable die assembly for drying materials as in claim 3, wherein said filter screen defines a turbulence chamber configured for receipt of the material passing through said opposing frustoconical surfaces.

5. A variable die assembly for drying materials as in claim 1, further comprising a gear attached to said adjustment sleeve for rotating said adjustment sleeve.

6. A variable die assembly for drying materials as in claim 1, wherein said filter screen is attached into an end of said adjustment sleeve.

7. A variable die assembly for drying materials as in claim 1, further comprising a seal positioned between an outer surface of the die body and an inner surface of the adjustment sleeve.

8. A method of drying material, comprising the steps of
    moving the material along a longitudinally-oriented conduit within a die body, the die body being positioned within an adjustment sleeve;
    passing the material between opposing surfaces defined by the die body and a filter screen, the filter screen being attached to the adjustment sleeve;
    flowing the material into a chamber defined by the filter screen;
    venting the material through a plurality of apertures located in the filter screen; and
    adjusting the pressure of the material in the die body by rotating the adjustment sleeve so as to change the distance between the opposing surfaces.

9. A method of drying material as in claim 8, further comprising the step of reducing the pressure of the material after said passing step.

10. A method of drying material as in claim 8, further comprising the step of determining the extent of said adjusting step based on physical properties of the material after said venting step.

11. A method of drying material as in claim 8, wherein said opposing surfaces are frustoconically-shaped.

12. A method of drying material as in claim 8, wherein said venting step facilitates the release of water in the material.

13. A method of drying material as in claim 12, wherein the water is superheated prior to said venting step.

14. A method of drying material as in claim 8, wherein said moving step comprises applying pressure to the material using an extruder.

15. A method of drying material as in claim 8, wherein said apertures are of a predetermined size and shape.

16. A method of drying material as in claim 8, wherein said adjusting step comprises rotating a gear attached to the adjustment sleeve.

\* \* \* \* \*